United States Patent
Huang et al.

(10) Patent No.: US 11,718,482 B2
(45) Date of Patent: Aug. 8, 2023

(54) SYSTEM AND METHOD OF MONITORING DISTURBANCE FORCE IN AN INDEPENDENT CART SYSTEM, COMPENSATION OF SAID DISTURBANCE FORCE

(71) Applicant: Rockwell Automation Technologies, Inc., Mayfield Heights, OH (US)

(72) Inventors: Yuhong Huang, Acton, MA (US); Sean Lu, Westborough, MA (US); Tracy M. Clark, Boston, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 390 days.

(21) Appl. No.: 17/007,167

(22) Filed: Aug. 31, 2020

(65) Prior Publication Data
US 2022/0063924 A1 Mar. 3, 2022

(51) Int. Cl.
*B65G 43/00* (2006.01)
*G05B 19/33* (2006.01)
*B65G 54/02* (2006.01)

(52) U.S. Cl.
CPC ............. *B65G 43/00* (2013.01); *B65G 54/02* (2013.01); *G05B 19/33* (2013.01); *G05B 2219/41337* (2013.01)

(58) Field of Classification Search
CPC ................. B65G 43/00; B65G 54/02; B65G 2203/0283; B65G 2203/0291;
(Continued)

(56) References Cited

U.S. PATENT DOCUMENTS 6,922,025 B2 * 7/2005 Smith ................... H02P 6/006
                                                318/568.22
8,796,959 B2 * 8/2014 Sato ........................ H02P 25/06
                                                318/135
(Continued)

FOREIGN PATENT DOCUMENTS

EP          3 650 972 A1    5/2020
JP       2010 126044 A      6/2010
(Continued)

OTHER PUBLICATIONS

Extended European Search Report dated Mar. 29, 2022; Application No./Patent No. 21191958.4-1202-(11) pages.

*Primary Examiner* — Gene O Crawford
*Assistant Examiner* — Keith R Campbell
(74) *Attorney, Agent, or Firm* — Boyle Fredrickson, SC

(57) ABSTRACT

A system and method for monitoring disturbance forces experienced by a mover in an independent cart system monitors current generated by a controller and a feedback signal corresponding to operation of the mover in response to the current generated by the controller. The controller stores a value of the current reference and of the feedback signal, sampled in tandem, and determines a disturbance force experienced by the mover as it travels along the track as a function of the stored values of the current reference and of the feedback signal. The controller may store the measured disturbance force experienced by the mover as a function of the location of the mover along the track. For each subsequent time the mover travels along the same length of track, the controller may add a compensation value to the current reference to reduce the disturbance force experienced by the mover.

20 Claims, 9 Drawing Sheets

(58) Field of Classification Search
CPC ........ H02P 6/006; H02P 25/06; H02P 29/028; G05B 19/33; G05B 2219/41337
See application file for complete search history.

(56) References Cited

U.S. PATENT DOCUMENTS

| | | | | |
|---|---|---|---|---|
| 8,970,142 | B2* | 3/2015 | Inoue | H02K 41/031 |
| | | | | 318/119 |
| 9,847,742 | B2* | 12/2017 | Suzuki | H02P 6/006 |
| 10,427,542 | B2* | 10/2019 | Hanaka | H02K 11/215 |
| 10,554,111 | B2* | 2/2020 | Weber | B60L 13/03 |
| 11,070,153 | B2* | 7/2021 | Van Dorpe | B65G 54/02 |
| 11,165,372 | B2* | 11/2021 | Huang | H02P 6/006 |
| 2019/0097552 | A1* | 3/2019 | Das | H02P 6/006 |

FOREIGN PATENT DOCUMENTS

| | | | | |
|---|---|---|---|---|
| WO | 2012/056844 A1 | 5/2012 | | |
| WO | WO-2012056844 A1 * | 5/2012 | ............ | H02P 21/00 |

* cited by examiner

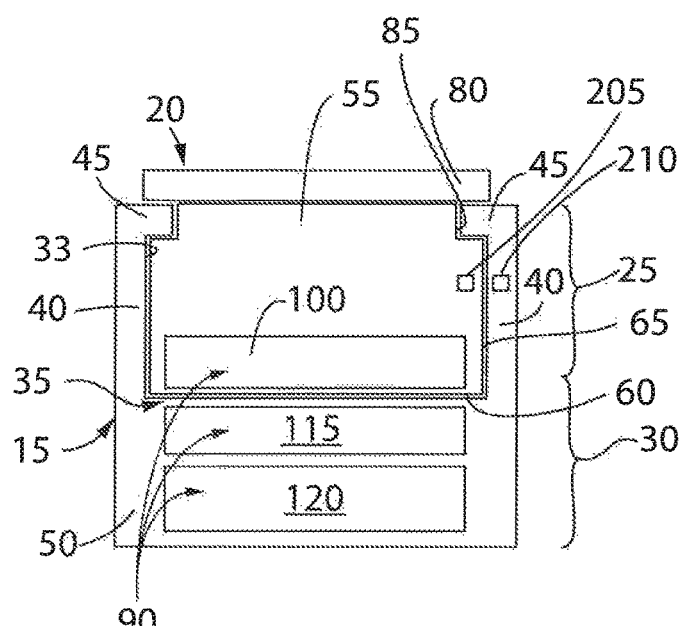
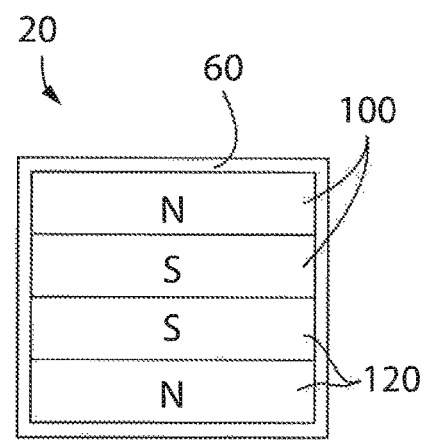
FIG. 2
FIG. 3
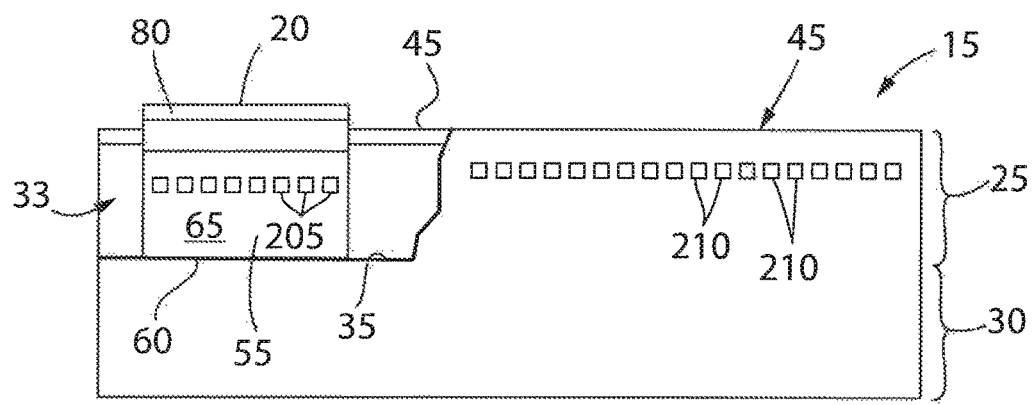
FIG. 4

SYSTEM AND METHOD OF MONITORING DISTURBANCE FORCE IN AN INDEPENDENT CART SYSTEM, COMPENSATION OF SAID DISTURBANCE FORCE

BACKGROUND INFORMATION

The present invention relates to motion control systems for a linear drive system and, more specifically, to disturbance force monitoring and compensation in the linear drive of an independent cart system.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

As is known to those skilled in the art, a mover may experience disturbance forces as it travels along the track. One such disturbance force is a cogging force generated within the linear drive system used to propel the mover along the track. The cogging force is a result of magnetic reluctance of the iron core stator and the interaction with the permanent magnets mounted to each mover. The cogging force is dependent on the size of the permanent magnet arrays present on a mover, on the air gap between the permanent magnet arrays on the mover and the stator extending along the track, and on the physical construction of the stator. The cogging force may also vary between "identical" movers due to component and/or manufacturing tolerances between two different movers. Other disturbance forces may be generated by sources external to the linear drive system such as friction or variations in the bearing on the mover or in the guides along the track. These external disturbance forces may vary as a function of the position of the mover along the track.

The controller driving the mover will attempt to regulate speed of the mover despite the disturbance forces experienced by a mover as it travels along the track. An exemplary command issued to a mover is to move between two locations along the track. The mover may be commanded to accelerate to a desired speed, travel at the desired speed, and then decelerate to a stop at the next location. Although the controller may generate a constant velocity reference for the mover while it is traveling at the desired speed, the disturbance forces may either oppose or add to the driving force generated in the stator. The disturbance force will cause the mover to either slow down or speed up, deviating from the desired speed. The controller, in response to detecting the speed deviation, will regulate the current supplied to the stator in an attempt to maintain the desired, constant speed. As a result, the current will increase or decrease, thereby increasing or decreasing the torque applied to the mover, where the torque controls the speed at which the mover travels. The disturbance force varies rapidly, for example, as a permanent magnet on the mover passes each coil mounted on the stator or as a mover travels over a location on the track with excessive wear or misalignment of a guide rail, resulting in excess friction at that location. The controller rapidly varies the current supplied to the stator in response to the disturbance force as it attempts to maintain the desired speed. However, the disturbance forces and resulting current regulation by the controller result in an undesired torque ripple due to the rapidly changing currents applied to the coils and a resultant velocity ripple seen on the mover as a result of torque ripple generated on the drive coils in the linear drive system.

Thus, it would be desirable to provide a system and method for monitoring the disturbance forces experienced by a mover in an independent cart system.

It would further be desirable to provide a system and method for compensating for the disturbance forces experienced by the mover in the independent cart system.

BRIEF DESCRIPTION

According to one embodiment of the invention, a method for monitoring disturbance force in a linear drive system is disclosed. A commanded current to be provided to a series of coils spaced along a length of a track in the linear drive system is generated with a controller, and the controller regulates a desired current provided to each of the series of coils. The desired current corresponds to the commanded current and establishes an electromagnetic field that interacts with at least one mover in the linear drive system to propel the mover along the track. A feedback signal is received at the controller, where the feedback signal is a measured position, a measured velocity, or both a measured position and a measured velocity of the at least one mover as it is propelled along the track by the desired current. The feedback signal and the commanded current at a corresponding sample time of the feedback signal are stored in memory of the controller. A disturbance force experienced by the at least one mover is determined at a plurality of positions along the track, where the disturbance force is determined by the controller and is a function of the commanded current and the stored feedback signal.

According to another embodiment of the invention, an apparatus for monitoring disturbance force in an independent cart system includes a track having a length, a plurality of coils spaced along the length of the track, at least one mover configured to travel along the track, a position feedback assembly configured to generate a feedback signal corresponding to operation of the at least one mover, and a controller. The feedback signal is a measured position, a measured velocity, or both a measured position and a measured velocity. The controller is configured to generate a commanded current to be provided to the plurality of coils and regulate a desired current output to the plurality of coils, where the desired current corresponds to the commanded current and establishes an electromagnetic field that interacts with the at least one mover to propel the mover along the track. The controller is further configured to periodically store the commanded current and the feedback signal in memory of the controller, and determine a disturbance force experienced by the at least one mover at a plurality of positions along the track, where the disturbance force is a function of the commanded current and the stored feedback signal.

According to another embodiment of the invention, a method for monitoring disturbance force in a linear drive system is disclosed. The linear drive system includes a plurality of movers configured to travel along a track, and the following steps are performed for each of the plurality of movers. A commanded current to be provided to a series of coils spaced along a length of the track is generated in the linear drive system with a controller, and a desired current, provided to each of the series of coils, is regulated with the controller, where the desired current corresponds to the commanded current and establishes an electromagnetic field that interacts with one of the plurality of movers in the linear drive system to propel the mover along the track. A feedback signal is received at the controller, where the feedback signal is a measured position of the mover as it is propelled along the track by the desired current. A disturbance force experienced by the mover at a plurality of positions along the track is determined and, the feedback signal and the disturbance force experienced by the mover are stored in memory of the controller. The disturbance force is determined by the controller and is a function of the commanded current.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 2 is a sectional view of one embodiment of a mover and track segment included in the linear drive system taken at 2-2 of FIG. 1;

FIG. 3 is a bottom plan view of the exemplary mover of FIG. 2;

FIG. 4 is a partial side cutaway view of the mover and track segment of FIG. 2;

Figure 1:
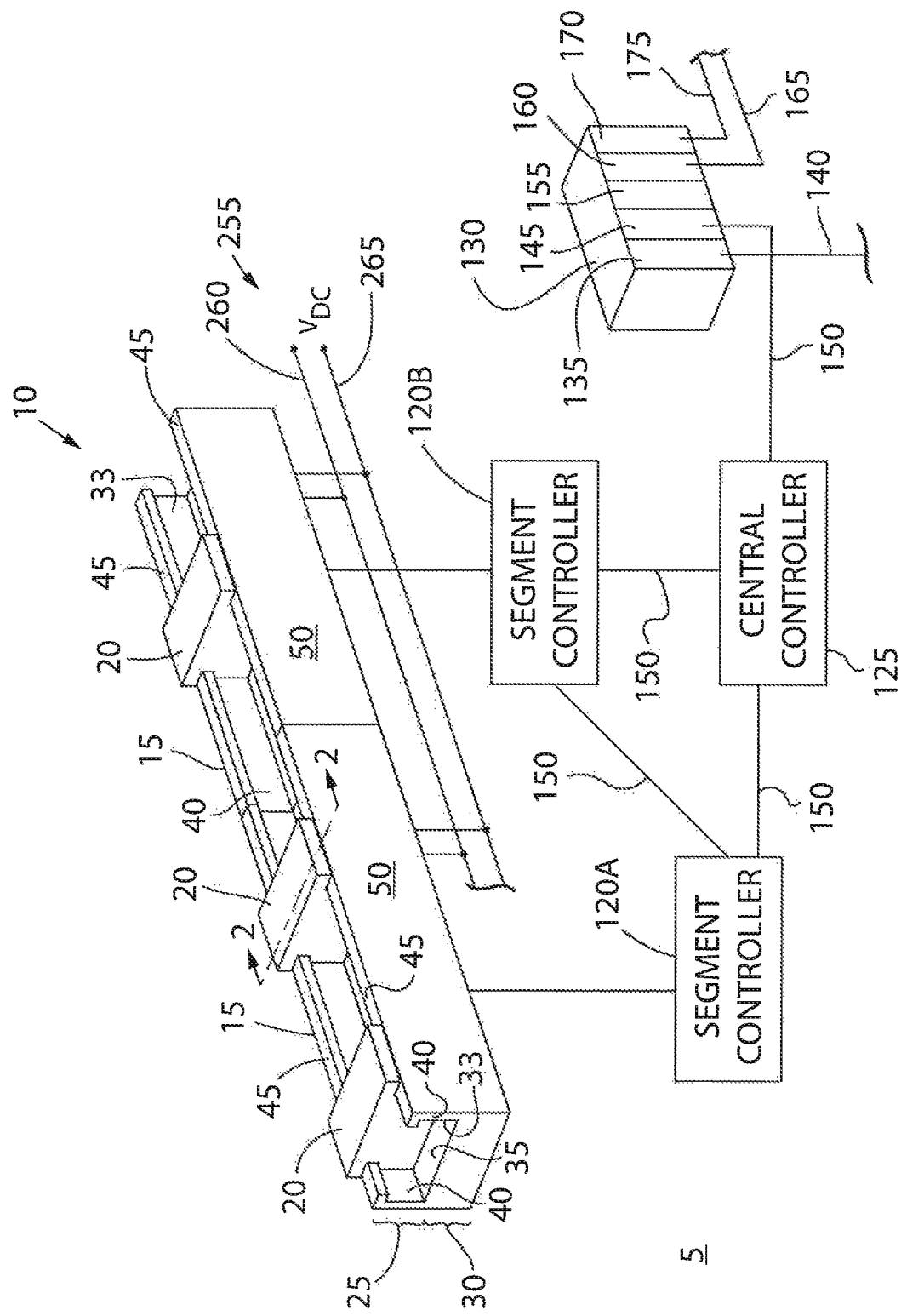
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein is directed towards a system and method for monitoring the disturbance forces experienced by a mover in an independent cart system. As a mover travels along a track, a controller generates a current reference, where the current reference corresponds to a current required to be supplied to a series of coils spaced along a length of the track to achieve desired operation of the mover. The controller regulates the current supplied to each coil in response to the current reference and receives a feedback signal corresponding to the operation of the mover. The feedback signal may be a measured velocity or measured position of the mover as it is propelled along the track by the current supplied to the coils on the track. The controller stores a value of the current reference and of the feedback signal sampled in tandem, such that the two values correspond to the same sampling interval. The controller is able to determine a disturbance force experienced by the mover as it travels along the track as a function of the stored values of the current reference and of the feedback signal.

In addition to monitoring the disturbance forces experienced by the mover, the system and method disclosed herein compensates for the disturbance forces experienced by the mover in the independent cart system. After determining the disturbance force experienced by the mover, the controller stores the disturbance force experienced by the mover as a function of the location of the mover along the track. Because disturbance forces are commonly generated in response to variations in the physical construction, alignment, or spatial relationship of the permanent magnets and coils as well as variations in friction as a mover travels along the track, a mover is likely to experience similar disturbance forces at the same location each time it travels along the same segment of track. By storing the value of the disturbance force experienced by a mover as it travels along the track, the controller may add a compensation value to the current reference for each subsequent time the mover travels along the same length of track.

In addition, the controller may be configured to learn performance over time without requiring a commissioning process. The controller monitors the disturbance forces experienced by a mover each time the mover travels along the same segment of track. The controller may adjust the stored values of the disturbance force on subsequent trips of a mover across the same track segment. For each subsequent trip, the controller may determine whether the adjustments increased or decreased the disturbance forces experienced by the mover. The controller may restore prior values of the stored disturbance force if an adjustment results in an increase in disturbance force experienced by the mover and may keep a new value of the stored disturbance force if an adjustment results in a decrease in disturbance force experienced by the mover. The controller may also be configured to maintain a table of disturbance forces for different movers such that each mover may be uniquely compensated according to the disturbance forces experienced by that mover along a particular track segment.

Turning initially to FIGS. 1-4, an exemplary transport system 5 (or simply "system 5") for moving articles or products includes a track 10 made up of multiple segments 15. According to the illustrated system 5, two segments 15 are joined end-to-end to define the overall track configuration. The illustrated segments 15 are both straight segments having generally the same length. It is understood that track segments of various sizes, lengths, and shapes may be connected together to form the track 10 without deviating from the scope of the invention. Track segments 15 may be joined to form a generally closed loop supporting a set of movers 20 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 20 will travel along the track and take various orientations according to the configuration of the track 10 and the relationships discussed herein may vary accordingly.

According to the illustrated system 5, each track segment 15 includes an upper portion 25 and a lower portion 30. The upper portion 25 is configured to carry the movers 20 and the lower portion 30 is configured to house the control elements. As illustrated, the upper portion 25 includes a generally u-shaped channel 33 extending longitudinally along the upper portion 25 of each segment. The channel 33 includes a bottom surface 35 and a pair of side walls 40, where each side wall 40 includes a rail 45 extending along an upper edge of the side wall 40. The bottom surface 35, side walls 40, and rails 45 extend longitudinally along the track segment 15 and define a guideway along which the movers 20 travel. According to one embodiment, the surfaces of the channel 33 (i.e., the bottom surface 35, side walls 40 and rails 45) are planar surfaces made of a low friction material along which movers 20 may slide. The contacting surfaces of the movers 20 may also be planar and made of a low friction material. It is contemplated that the surface may be, for example, nylon, Teflon®, aluminum, stainless steel and the like. Optionally, the hardness of the surfaces on the track segment 15 are greater than the contacting surface of the movers 20 such that the contacting surfaces of the movers 20 wear faster than the surface of the track segment 15. It is further contemplated that the contacting surfaces of the movers 20 may be removably mounted to the housing 50 of the mover 20 such that they may be replaced if the wear exceeds a predefined amount. According to still other embodiments, the movers 20 may include low-friction rollers to engage the surfaces of the track segment 15. Optionally, the surfaces of the channel 33 may include different cross-sectional forms with the mover 20 including complementary sectional forms. Various other combinations of shapes and construction of the track segment 15 and mover 20 may be utilized without deviating from the scope of the invention.

According to the illustrated system 5, each mover 20 is configured to slide along the channel 33 as it is propelled by a linear drive system. The mover 20 includes a body 55 configured to fit within the channel 33. The body 55 includes a lower surface 60, configured to engage the bottom surface 35 of the channel 33, and side surfaces 65 configured to engage the side walls 40 of the channel 33. The mover 20 further includes a shoulder 70 extending inward from each of the side surfaces 65. The shoulder 70 has a width equal to or greater than the width of the rail 45 protruding into the channel 33. A neck of the mover then extends upward to a top surface 75 of the body 55. The neck extends for the thickness of the rails such that the top surface 75 of the body 55 is generally parallel with the upper surface of each rail 45. The mover 20 further includes a platform 80 secured to the top surface 75 of the body 55. According to the illustrated embodiment, the platform 80 is generally square and the width of the platform 80 is greater than the width between the rails 45. The lower surface of the platform 80, an outer surface of the neck, and an upper surface of the shoulder 70 define a channel 85 in which the rail 45 runs. The channel 85 serves as a guide to direct the mover 20 along the track. It is contemplated that platforms or attachments of various shapes may be secured to the top surface 75 of the body 55. Further, various workpieces, clips, fixtures, and the like may be mounted on the top of each platform 80 for engagement with a product to be carried along the track by the mover 20. The platform 80 and any workpiece, clip, fixture, or other attachment present on the platform may define, at least in part, a load present on the mover 20.

The mover 20 is carried along the track 10 by a linear drive system 90 (FIG. 2). The linear drive system is incorporated in part on each mover 20 and in part within each track segment 15. According to the illustrated embodiment, drive coils 115 are positioned along the length of each track segment, and one or more drive members 100 are mounted to each mover 20. It is contemplated that the drive members may be drive magnets, steel back iron and teeth, conductors, or any other suitable member that will interact with the electromagnetic fields generated by the coils 115 to propel each mover 20 along the track 10. For convenience, each drive member 100 will be discussed herein as a drive magnet. Alternately, it is contemplated that drive members 100 may be mounted along the length of each track segment and one or more drive coils 115 may be mounted to each mover 20 with the associated controllers to regulate current flow in each drive coil also mounted to each mover.

With reference to FIG. 3, the drive magnets 100 are arranged in a block on the lower surface of each mover. The drive magnets 100 include positive magnet segments 105, having a north pole, N, facing outward from the mover and negative magnet segments 110, having a south pole, S, facing outward from the mover. According to the illustrated system 5, two positive magnet segments 105 are located on the outer sides of the set of magnets and two negative magnet segments 110 are located between the two positive magnet segments 105. Optionally, the positive and negative motor segments may be placed in an alternating configuration. In still other constructions, a single negative magnet segment 110 may be located between the positive magnet segments 105. According to still another embodiment, the drive magnets 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 100 may be utilized without deviating from the scope of the invention.

Figure 5:
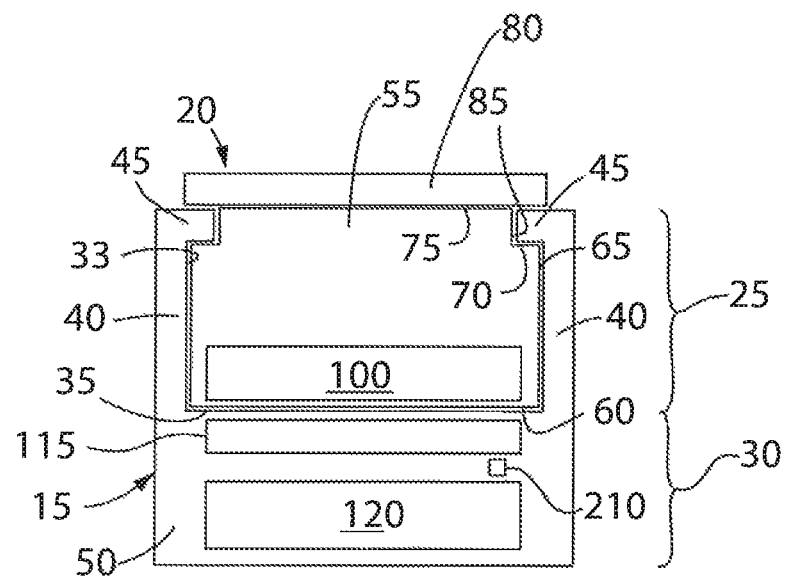
FIG. 5 is a sectional view of another embodiment of a mover and track segment included in the linear drive system taken at 2-2 of FIG. 1.
Figure 6:
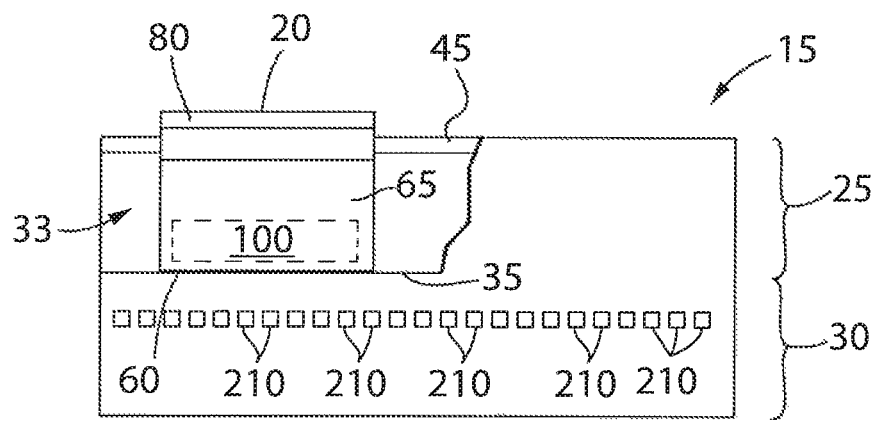
FIG. 6 is a partial side cutaway view of the mover and track segment of FIG. 5.

The linear drive system 90 further includes a series of coils 115 spaced along the length of the track segment 15. With reference also to FIGS. 5 and 6, the coils 115 may be positioned within the housing 50 for the track segment 15 and below the bottom surface 35 of the channel 33. The coils 115 are energized sequentially according to the configuration of the drive magnets 100 present on the movers 20. The sequential energization of the coils 115 generates a moving electromagnetic field that interacts with the magnetic field of the drive magnets 100 to propel each mover 20 along the track segment 15.

A segment controller 120 is provided with each track segment 15 to control the linear drive system and to achieve the desired motion of each mover 20 along the track segment 15. Although illustrated in FIG. 1 as blocks external to the track segments 15, the arrangement is to facilitate illustration of interconnects between controllers. As shown in FIG. 2, it is contemplated that each segment controller 120 may be mounted in the lower portion 30 of the track segment 15. Each segment controller 120 is in communication with a central controller 125 which is, in turn, in communication with an industrial controller 130. The industrial controller 130 may be, for example, a programmable logic controller (PLC) configured to control elements of a process line stationed along the track 10. The process line may be configured, for example, to fill and label boxes, bottles, or other containers loaded onto or held by the movers 20 as they travel along the line. In other implementations, robotic assembly stations may perform various assembly and/or machining tasks on workpieces carried along by the movers 20. The exemplary industrial controller 130 includes: a power supply 135 with a power cable 140 connected, for example, to a utility power supply; a communication module 145 connected by a network medium 150 to the central controller 125; a processor module 155; an input module 160 receiving input signals 165 from sensors or other devices along the process line; and an output module 170 transmitting control signals 175 to controlled devices, actuators, and the like along the process line. The processor module 155 may identify when a mover 20 is required at a particular location and may monitor sensors, such as proximity sensors, position switches, or the like to verify that the mover 20 is at a desired location. The processor module 155 transmits the desired locations of each mover 20 to a central controller 125 where the central controller 125 operates to generate commands for each segment controller 120.

Figure 7:
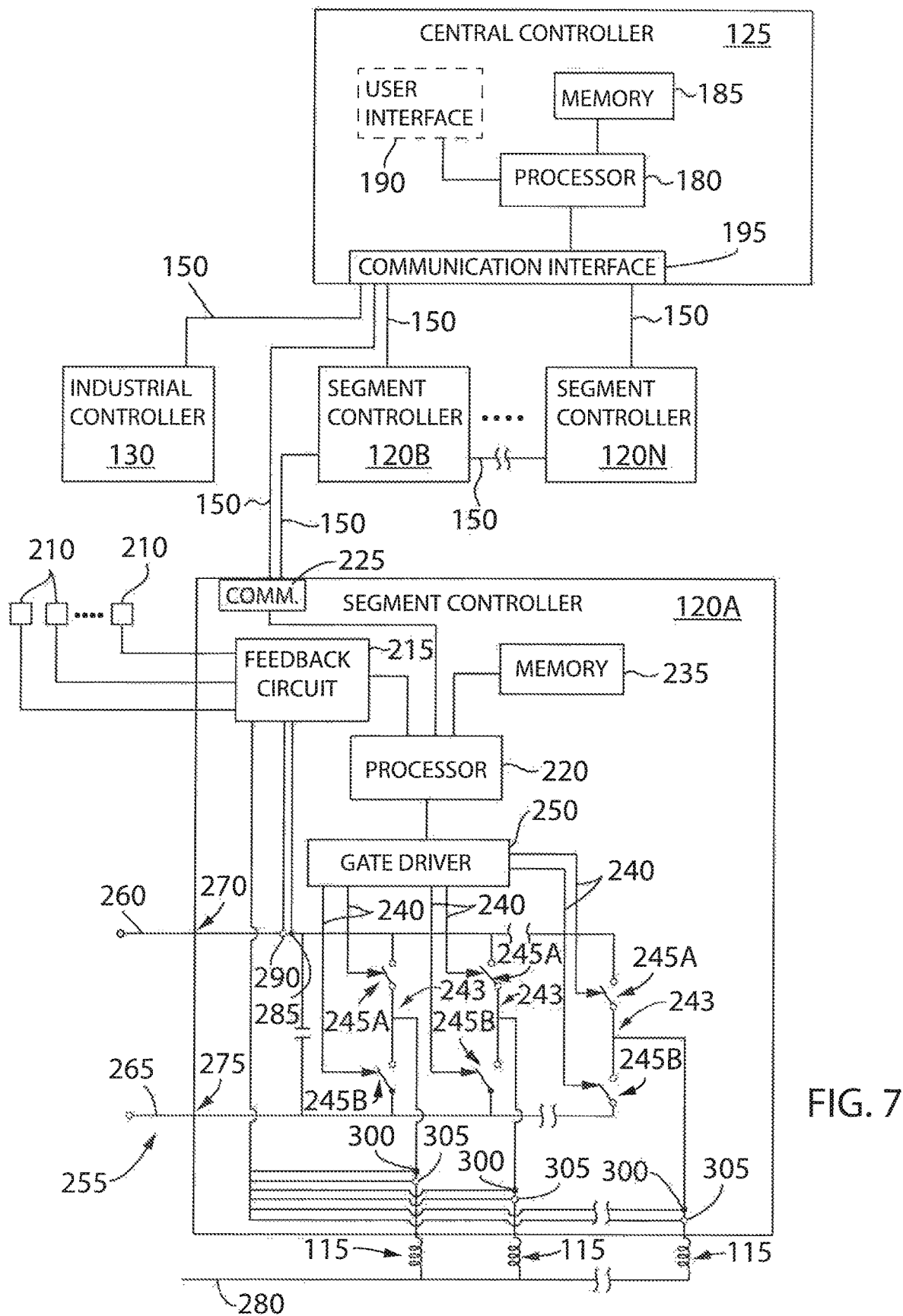
FIG. 7 is a block diagram representation of the one embodiment of the exemplary control system of FIG. 1.

With reference also to FIG. 7, the central controller 125 includes a processor 180 and a memory 185. It is contemplated that the processor 180 and memory 185 may each be a single electronic device or formed from multiple devices. The processor 180 may be a microprocessor. Optionally, the processor 180 and/or the memory 185 may be integrated on a field programmable gate array (FPGA) or an application specific integrated circuit (ASIC). The memory 185 may include volatile memory, non-volatile memory, or a combination thereof. An optional user interface 190 may be provided for an operator to configure the central controller 125 and to load or configure desired motion profiles for the movers 20 on the central controller 125. Optionally, the configuration may be performed via a remote device connected via a network and a communication interface 195 to the central controller 125. It is contemplated that the central controller 125 and user interface 190 may be a single device, such as a laptop, notebook, tablet or other mobile computing device. Optionally, the user interface 190 may include one or more separate devices such as a keyboard, mouse, display, touchscreen, interface port, removable storage medium or medium reader and the like for receiving information from and displaying information to a user. Optionally, the central controller 125 and user interface may be an industrial computer mounted within a control cabinet and configured to withstand harsh operating environments. It is contemplated that still other combinations of computing devices and peripherals as would be understood in the art may be utilized or incorporated into the central controller 125 and user interface 190 without deviating from the scope of the invention.

The central controller 125 includes one or more programs stored in the memory 185 for execution by the processor 180. The central controller 125 receives a desired position from the industrial controller 130 and determines one or more motion profiles for the movers 20 to follow along the track 10. A program executing on the processor 180 is in communication with each segment controller 120 on each track segment via the network medium 150. The central controller 125 may transfer a desired motion profile to each segment controller 120. Optionally, the central controller 125 may be configured to transfer the information from the industrial controller 130 identifying one or more desired movers 20 to be positioned at or moved along the track segment 15, and the segment controller 120 may determine the appropriate motion profile for each mover 20.

A position feedback system provides knowledge of the location of each mover 20 along the length of the track segment 15 to the segment controller 120. According to the system 5 illustrated in FIGS. 2 and 4, the position feedback system includes one or more position magnets 205 mounted to the mover 20 and an array of sensors 210 spaced along the side wall 40 of the track segment 15. The sensors 210 are positioned such that each of the position magnets 205 is proximate to the sensor as the mover 20 passes each sensor 210. The sensors 210 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 210 outputs a feedback signal provided to the segment controller 120 for the corresponding track segment 15 on which the sensor 210 is mounted. The feedback signal may be an analog signal provided to a feedback circuit 215 which, in turn, provides a signal to the processor 220 corresponding to the magnet 205 passing the sensor 210.

According to another arrangement, illustrated in FIGS. 5 and 6, the position feedback system utilizes the drive magnets 100 as position magnets. Position sensors 210 are positioned along the track segment 15 at a location suitable to detect the magnetic field generated by the drive magnets 100. According to the illustrated embodiment, the position sensors 210 are located below the coils 115. Optionally, the position sensors 210 may be interspersed with the coils 115 and located, for example, in the center of a coil or between adjacent coils. According to still another embodiment, the position sensors 210 may be positioned within the upper portion 25 of the track segment 15 and near the bottom surface 35 of the channel 33 to be aligned with the drive magnets 100 as each mover 20 travels along the tracks segment 15.

Referring again to FIG. 7, the segment controller 120 also includes a communication interface 225 that receives communications from the central controller 125 and/or from adjacent segment controllers 120. The communication interface 225 extracts data from the message packets on the industrial network and passes the data to a processor 230 executing in the segment controller 120. The processor may be a microprocessor. Optionally, the processor 230 and/or a memory 235 within the segment controller 120 may be integrated on a field programmable gate array (FPGA) or an application specific integrated circuit (ASIC). It is contemplated that the processor 230 and memory 235 may each be a single electronic device or formed from multiple devices. The memory 235 may include volatile memory, non-volatile memory, or a combination thereof. The segment controller 120 receives the motion profile or desired motion of the movers 20 and utilizes the motion commands to control movers 20 along the track segment 15 controlled by that segment controller 120.

Each segment controller 120 generates switching signals to generate a desired current and/or voltage at each coil 115 in the track segment 15 to achieve the desired motion of the movers 20. The switching signals 240 control operation of switching devices 245 for the segment controller 120. According to the illustrated system 5, the segment controller 120 includes a dedicated gate driver module 250 which receives command signals from the processor 220, such as a desired voltage and/or current to be generated in each coil 115, and generates the switching signals 240. Optionally, the processor 220 may incorporate the functions of the gate driver module 250 and directly generate the switching signals 240. The switching devices 245 may be a solid-state device that is activated by the switching signal, including, but not limited to, transistors, thyristors, or silicon-controlled rectifiers.

According to the illustrated system 5, the track 10 receives power from a distributed DC voltage. A DC bus 255 receives a DC voltage, VDC, from a DC supply and conducts the DC voltage to each track segment 15. The illustrated DC bus 255 includes two voltage rails 260, 265 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 15, it is contemplated that the DC bus 255 would extend within the lower portion 30 of the track segment. Each track segment 15 includes connectors to which either the DC supply or another track segment may be connected such that the DC bus 255 may extend for the length of the track 10. Optionally, each track segment 15 may be configured to include a rectifier section (not shown) and receive an AC voltage input. The rectifier section in each track segment 15 may convert the AC voltage to a DC voltage utilized by the corresponding track segment.

The DC voltage from the DC bus 255 is provided at the input terminals 270, 275 to a power section for the segment controller. A first voltage potential is present at the first input terminal 270 and a second voltage potential is present at the second input terminal 275. The DC bus 255 extends into the power section defining a positive rail 260 and a negative rail 265 within the segment controller 120. The terms positive and negative are used for reference herein and are not meant to be limiting. It is contemplated that the polarity of the DC voltage present between the input terminals 260, 265 may be negative, such that the potential on the negative rail 265 is greater than the potential on the positive rail 260. Each of the voltage rails 260, 265 are configured to conduct a DC voltage having a desired potential, according to application requirements. According to one arrangement, the positive rail 260 may have a DC voltage at a positive potential and the negative rail 265 may have a DC voltage at ground potential. Optionally, the positive rail 260 may have a DC voltage at ground potential and the negative rail 265 may have a DC voltage at a negative potential. According to still another arrangement, the positive rail 260 may have a first DC voltage at a positive potential with respect to the ground potential and the negative rail 265 may have a second DC voltage at a negative potential with respect to the ground potential. The resulting DC voltage potential between the two rails 260, 265 is the difference between the potential present on the positive rail 260 and the negative rail 265.

It is further contemplated that the DC supply may include a third voltage rail having a third voltage potential. According to one implementation, the positive rail 260 has a positive voltage potential with respect to ground, the negative rail 265 has a negative voltage potential with respect to ground, and the third voltage rail is maintained at a ground potential. Optionally, the negative voltage rail 265 may be at a ground potential, the positive voltage rail 260 may be at a first positive voltage potential with respect to ground, and the third voltage rail may be at a second positive voltage potential with respect to ground, where the second positive voltage potential is approximately one half the magnitude of the first positive voltage potential. With such a split voltage DC bus, two of the switching devices 245 may be used in pairs to control operation of one coil 115 by alternately provide positive or negative voltages to one the coils 115.

The power section in each segment controller 120 may include multiple legs, where each leg is connected in parallel between the positive rail 260 and the negative rail 265. According to the illustrated system 5, three legs are shown arranged in a half-bridge configuration. However, the number of legs may vary and will correspond to the number of coils 115 extending along the track segment 15. Each leg includes a first switching device 245a and a second switching device 245b connected in series between the positive rail 260 and the negative rail 265 with a common connection 243 between the first and second switching devices 245a, 245b. The first switching device 245a in each leg 221 may also be referred to herein as an upper switch, and the second switching device 245*b* in each leg 221 may also be referred to herein as a lower switch. The terms upper and lower are relational only with respect to the schematic representation and are not intended to denote any particular physical relationship between the first and second switching devices 245*a*, 245*b*. The switching devices 245 include, for example, power semiconductor devices such as transistors, thyristors, and silicon-controlled rectifiers, which receive the switching signals 240 to turn on and/or off. Each of switching devices may further include a diode connected in a reverse parallel manner between the common connection 243 and either the positive or negative rail 260, 265.

Figure 8:
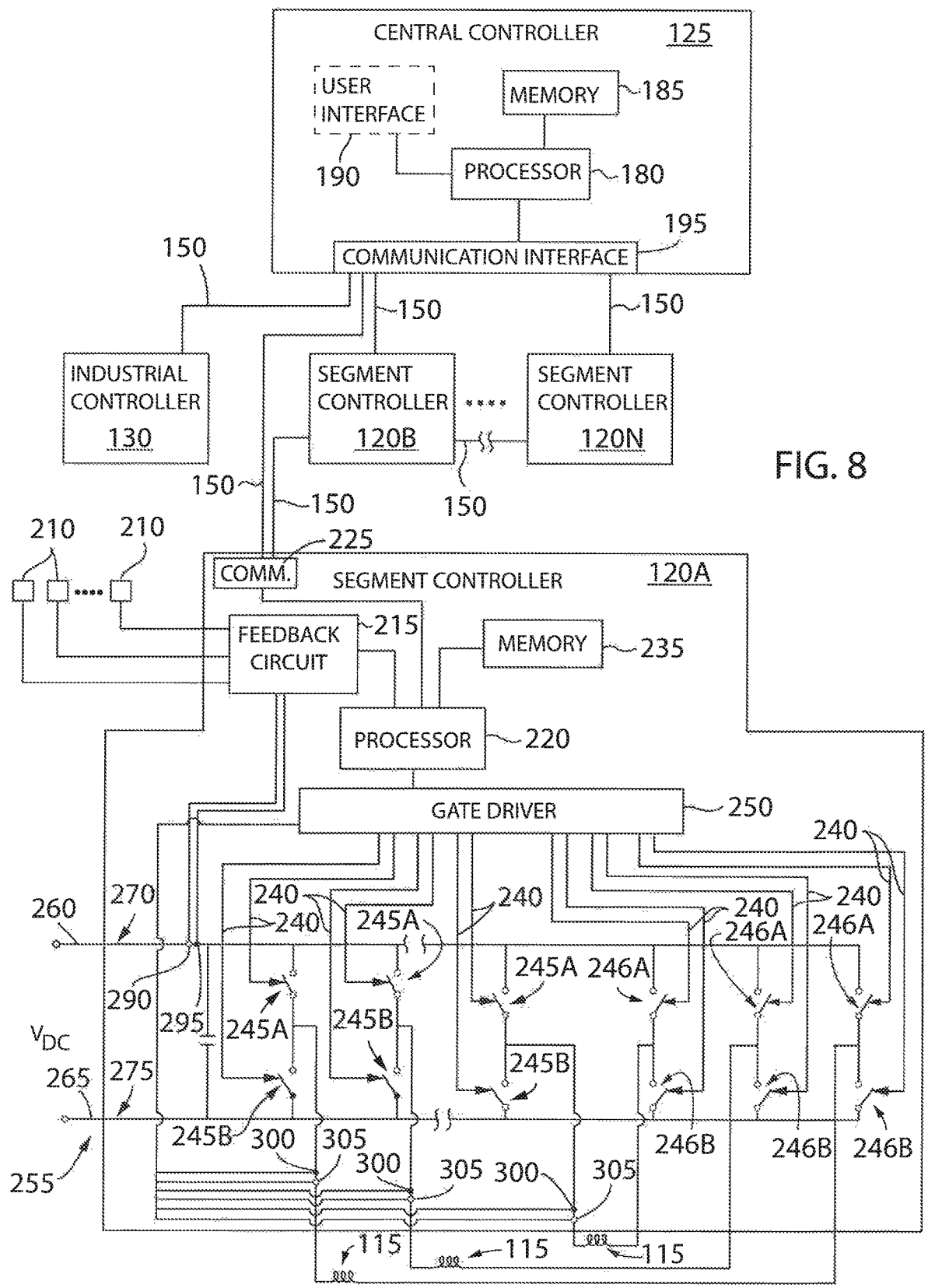
FIG. 8 is a block diagram representation of another embodiment of the exemplary control system of FIG. 1.

According to the embodiment illustrated in FIG. 8, three legs are shown arranged in a full-bridge configuration. Again, the number of legs may vary and will correspond to the number of coils 115 extending along the track segment 15. Each leg includes a first switching device 245*a* and a second switching device 245*b* connected in series on one side of the coil 115. The first and second switching devices 245*a*, 245*b* are connected between the positive rail 260 and the negative rail 265 with a first common connection between the first and second switching devices 245*a*, 245*b*. The first common connection is connected to the first side of the coil 115. Each leg further includes a third switching device 246*a* and a fourth switching device 246*b* connected in series on the other side of the coil 115. The third and fourth switching devices 246*a*, 246*b* are connected between the positive rail 260 and the negative rail 265 with a second common connection between the third and fourth switching devices 246*a*, 246*b*. The second common connection is connected to the second side of the coil 115. The first and third switching devices 245*a*, 246*a* in each leg may also be referred to herein as upper switches, and the second and fourth switching devices 245*b*, 246*b* in each leg may also be referred to herein as lower switches. The terms upper and lower are relational only with respect to the schematic representation and are not intended to denote any particular physical relationship between the switching devices. The switching devices 245, 246 include, for example, power semiconductor devices such as transistors, thyristors, and silicon-controlled rectifiers, which receive the switching signals 240 to turn on and/or off. Each of switching devices 245, 246 may further include a diode connected in a reverse parallel manner between the first or second common connection and either the positive or negative rail 260, 265.

With reference again to FIG. 7, the processor 220 also receives feedback signals from sensors providing an indication of the operating conditions within the power segment or of the operating conditions of a coil 115 connected to the power segment. According to the illustrated system 5, the power segment includes a voltage sensor 285 and a current sensor 290 at the input of the power segment. The voltage sensor 285 generates a voltage feedback signal and the current sensor 290 generates a current feedback signal, where each feedback signal corresponds to the operating conditions on the positive rail 260. The segment controller 120 also receives feedback signals corresponding to the operation of coils 115 connected to the power segment. A voltage sensor 300 and a current sensor 305 are connected in series with the coils 115 at each output of the power section. The voltage sensor 300 generates a voltage feedback signal and the current sensor 305 generates a current feedback signal, where each feedback signal corresponds to the operating condition of the corresponding coil 115. The processor 230 executes a program stored on the memory device 235 to regulate the current and/or voltage supplied to each coil and the processor 230 and/or gate driver module 250 generates switching signals 240 which selectively enable/disable each of the switching devices 245 to achieve the desired current and/or voltage in each coil 115. With reference also to FIG. 8, it is contemplated that the feedback signals from the current sensor 305 and/or the voltage sensor 300 corresponding to the operation of the coils 115 may be provided to a dedicated current regulator device. As shown in FIG. 8, the feedback signals are provided directly to the gate driver 250 which would, in turn, regulate the current output to each coil and generate the switching signals 240 accordingly. The energized coils 115 create an electromagnetic field that interacts with the drive magnets 100 on each mover 20 to control motion of the movers 20 along the track segment 15.

Figure 9:
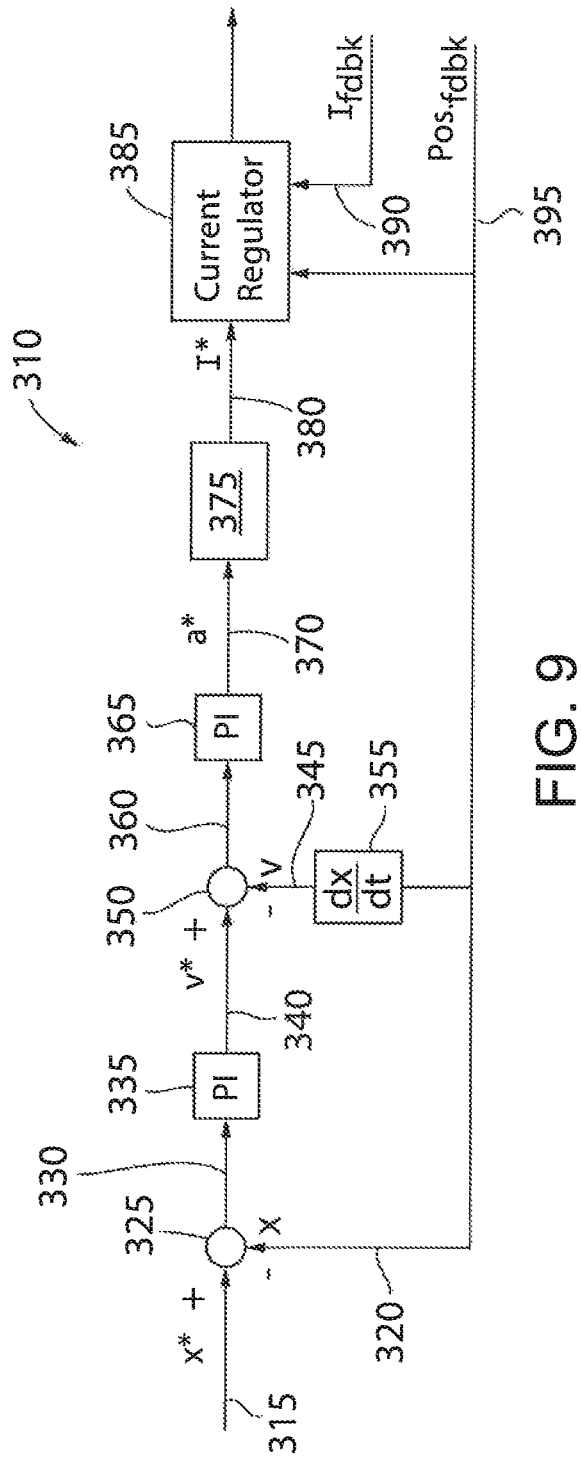
FIG. 9 is an exemplary control module included for execution on a segment controller according to one embodiment of the invention.

In one operation, each track segment 15 is configured to control operation of each mover 20 present on the track segment 15. The segment controller 120 receives a command signal corresponding to the desired operation of each mover 20 and controls the current output to each coil 115 to achieve the desired operation. With reference to FIG. 9, one implementation of a control module 310 executable by the segment controller 120 is illustrated. The control module 310 receives a position command signal (x*) 315 as an input. The position command signal (x*) is compared to a position feedback signal (x) 320 at a first summing junction 325. A position error signal 330 is output from the first summing junction 325 and input to a position loop controller 335. According to FIG. 9, the position loop controller 335 includes a proportional and an integral (PI) controller. Optionally, the position loop controller 335 may be just a proportional (P) controller or further include a derivative (D) controller. Each of the proportional (P), integral (I), and/or derivative (D) controllers of the position loop controller 335 includes a controller gain value. The controller gain values are commonly referred to as a proportional gain (Kpp), integral gain (Kpi), and a derivative gain (Kpd). The output of the position loop controller 335 is a velocity reference signal (v*) 340.

The velocity reference signal (v*) 340 is compared to a velocity feedback signal (v) 345 at a second summing junction 350. The velocity feedback signal (v) 345 is generated by a derivative block 355 acting on the position feedback signal 320. A velocity error 360 signal is output from the second summing junction 350 and input to a velocity loop controller 365. According to FIG. 9, the velocity loop controller 365 includes a proportional and an integral (PI) controller. Optionally, the velocity loop controller 365 may be just a proportional (P) controller or further include a derivative (D) controller. Each of the proportional (P), integral (I), and/or derivative (D) controllers of the velocity loop controller 365 includes a controller gain value. The controller gain values are commonly referred to as a proportional gain (Kvp), integral gain (Kvi), and a derivative gain (Kvd). The output of the velocity loop controller 365 is an acceleration reference signal (a*) 370.

The acceleration reference signal 370 is passed through an additional gain and filter block 375. The gain and filter block 375 may include one or more filters to remove unwanted components from the control system. For example, a low pass filter may be provided to attenuate undesirable high frequency components and a notch filter to attenuate specific frequency components having an undesirable effect on the controlled mechanical load. The gain and filter block 375 may also include an inertial gain factor or a torque constant gain factor. An inertial gain factor converts the acceleration reference to a torque reference and the torque constant gain factor converts a torque reference to a current reference, I*, 380. Optionally, gain factors may be incorporated into a single gain or incorporated with filter or controller gains. Combining the inertial and/or torque constant gain factors together or with another controller gain or with the filter gain reduces the real time computational burden imposed on the segment controller 120.

The current reference, I*, 380 is, in turn, passed to a current regulator 385, which controls the current supplied to each coil 115 on the track segment. The current regulator 385 receives current feedback signals 390 from the current sensors 305 and position feedback information 395 identifying the measured position of each mover 20 or a compensated position of each mover, as will be discussed in more detail below. Because a mover 20 may span multiple coils 115, the current regulator 385 determines an appropriate current for each coil 115 to produce the force desired to control the mover as indicated by the current reference, I*, 380 and determines a resultant current desired for each coil 115. The current regulator 385 uses the current and position feedback information, 390 and 395, to regulate the current to each coil 115, accordingly.

The output of the current regulator 385 is provided as an input to the gate driver module 250. With reference again to FIG. 7, the gate driver module 250 converts the input to a desired output voltage having a variable amplitude and frequency. Having determined the desired output voltage required to produce the commanded input, the gate driver module 250 generates the gating signals 240 used by pulse width modulation (PWM) or by other modulation techniques to control the switching elements 245A, 245B to produce the desired currents in each coil 115, resulting in the desired motion for each mover 20. As illustrated in FIG. 9 and as discussed above, the control module 310 utilizes position feedback information to regulate the current output to each coil 115.

Figure 11:
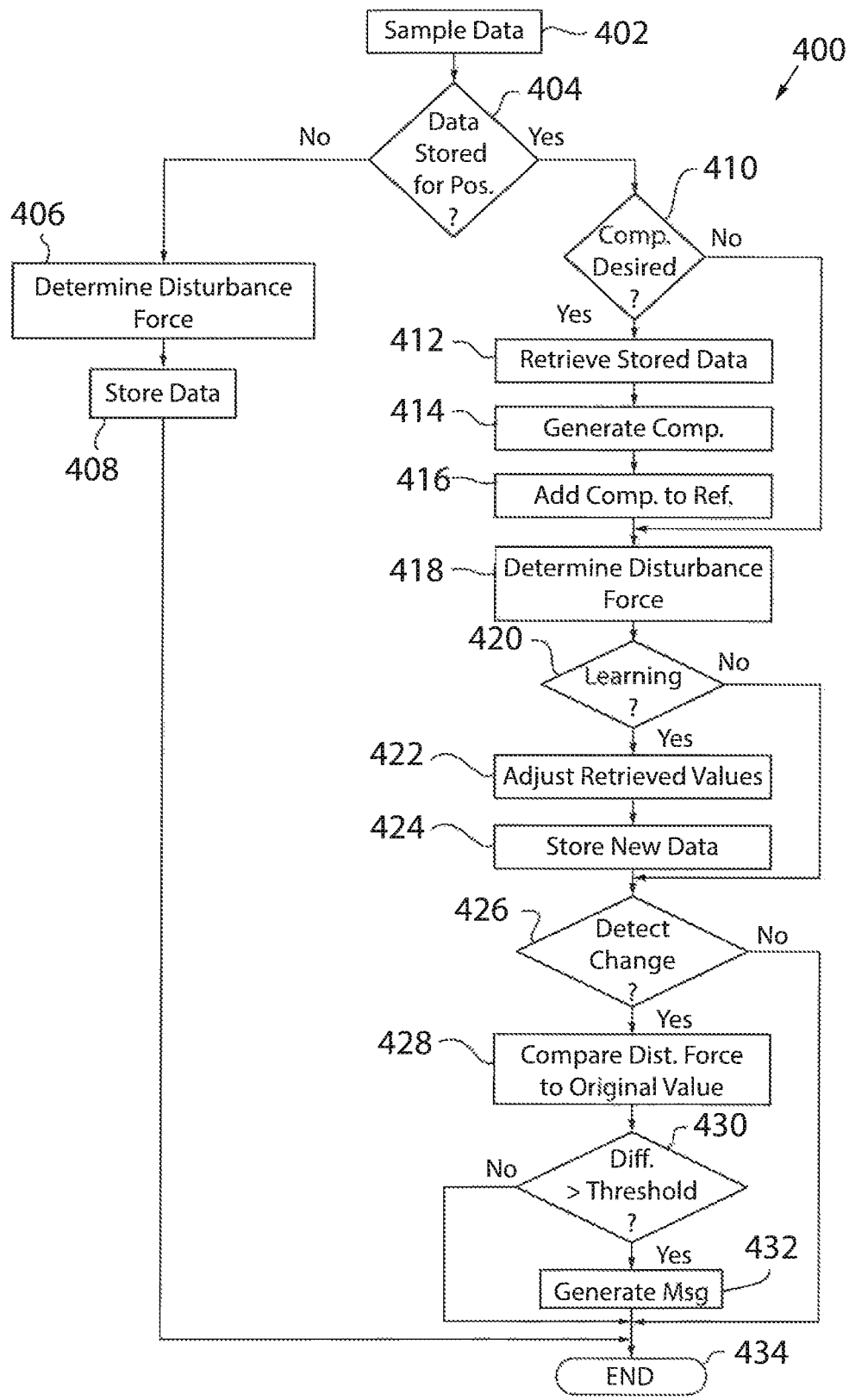
FIG. 11 is a flow diagram of one embodiment of the method for monitoring and compensating for disturbance forces in an independent cart system.

In operation, a controller for the independent cart system 5 is configured to monitor disturbance forces present on a mover 20 as it travels along a track 10 in the independent cart system. Turning next to FIG. 11, a flow diagram 400 for one embodiment of the method for monitoring disturbance forces present on the mover 20 is illustrated. For purposes of discussion, it is contemplated that the method is executing on the independent cart system 5 illustrated in FIG. 1. Each segment controller 120 is configured to monitor disturbance forces of each mover 20 present on the corresponding track segment 15. As will be discussed in more detail below, compensation of the disturbance forces will be discussed with respect to execution by the segment controllers 120. Optionally a central controller 125 may be configured to monitor and/or compensate for disturbance forces present along multiple track segments or along the entire track 10. It is contemplated that various steps of the illustrated process may be executed on the segment controller 120 or on the central controller 125 without deviating from the scope of the invention.

Figure 10:
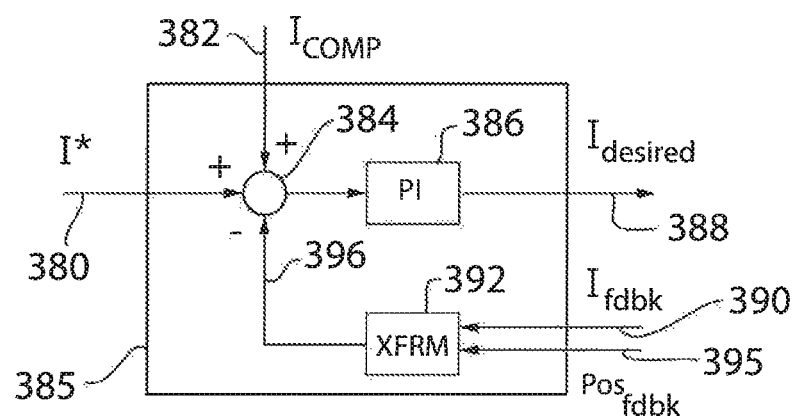
FIG. 10 is a block diagram representation of the current regulator from the exemplary control module in FIG. 9.

With reference also to FIG. 10, a current regulator 385 executing in the segment controller 120 periodically samples position feedback signals 395 and current feedback signals 390. As previously discussed, the current reference, I*, 380 corresponds to a current required in the linear drive system to propel a mover. This current may, however, need to be supplied by different coils 115 along the track as a function of the position of the mover 20 along each track segment 15. Similarly, the total current feedback may need to be combined using current feedback signals 390 from multiple coils 115 as a function of the position of the mover 20 along each track segment before comparing the measured current 396 to the current reference 380. A transform function 392 may be provided in the current regulator 385 to convert the measured current from each current feedback signal 390 to a total measured current 396 as a function of the position feedback signal 395 which is also provided to the transform function 392. It is further contemplated that current regulation may be achieved in a reference frame other than a physical reference frame, such as a d-q reference frame. The d-q reference frame defines current as a flux producing component (i.e., the d-axis current) and a torque producing component (i.e., the q-axis current). Traditional control techniques may be applied to each of the flux producing and the torque producing components to achieve a desired flux and a desired torque in the linear drive system. Conversion between reference frames is also dependent on measured current feedback signals 390 and the physical location of the mover 20 as determined by position feedback signals 395. The transform function 392 my further include any necessary reference frame transformations required by the current regulator 385.

Turning again to FIG. 11, data used to determine the disturbance force is sampled as shown in step 402. The disturbance force is determined as a function of the current reference 380 and of either a sampled position of the mover 20, sampled velocity of the mover, or a combination thereof. It is desirable that the current reference value 380 correspond to the sampling instant for the sample position or velocity. At the sampling instant, the sample position and/or sampled velocity and the current reference signal 380 may be stored in memory 235 of the segment controller 120 for subsequent use in determining the disturbance force.

At step 404, the segment controller 120 may check whether any prior data regarding a disturbance force for the present location of a mover 20 travelling on the track segment 15. If a prior disturbance force has been stored, the segment may generate a current compensation signal 382, as will be discussed in more detail below. If a prior disturbance force has not been stored for the mover 20 at the present location, this is an initial calculation of a disturbance force expected at the location for the mover 20. As shown in steps 406 and 408, the segment controller 120 determines a disturbance force for the mover 20 at the present location and stores the disturbance force in memory 235. Determination of the disturbance force may be performed using Equations (1)-(3) as shown below.

$$d_1 = \frac{2(x_{n+1} - 2x_n + x_{n-1})}{T^2} - \frac{I_n K}{M} \quad (1)$$

where:
$d_1$ is a first calculation of an acceleration resulting from a disturbance force,
x is the sampled value of the position feedback information,
n is the present sampling instant,
n+1 is the next sampling instant,
n−1 is the previous sampling instant,
T is the measurement interval,
I is the reference current,
K is a nominal thrust constant for the mover, and
M is the nominal mass of the mover and payload present on the mover.

$$d_2 = \frac{v_{n+1} - v_n}{T} - \frac{I_n K}{M} \quad (2)$$

where:
$d_2$ is a second calculation of an acceleration resulting from a disturbance force,
v is the sampled value of the velocity feedback information,
n is the present sampling instant,
n+1 is the next sampling instant,
T is the measurement interval,
I is the reference current,
K is a nominal thrust constant for the mover, and
M is the nominal mass of the mover and payload present on the mover.

$$d = wd_1 + (1-w)d_2 \quad (3)$$

where:
d is the final value of the acceleration resulting from a disturbance force,
$d_1$ is the first calculation of disturbance force,
$d_2$ is the second calculation of disturbance force, and
w is a weighting factor, As indicated above, $d_1$, $d_2$, and d are each calculations of an acceleration present in the system as a result of the mover 20 experiencing a disturbance force. As is well understood by Newton's second law of motion, a force is determined by multiplying acceleration by mass. If it is desired to put the above equations in terms of a disturbance force, each of the terms may be multiplied by the mass, M, present for each mover or for the mover and payload present on the mover. However, for implementation in a motor controller, it may be desirable to utilize the equations in terms of the acceleration. As utilized herein, Equations 1-3 will be referenced as determining a disturbance force. However, it is understood that the equations determine an acceleration and that the relationship between the disturbance acceleration and the force is a multiple of the mass present for each mover.

The first equation uses sampled position feedback information 395 in order to determine a first value of a disturbance force, $d_1$, experienced by the mover 20. As noted in Equation 1, samples of the position feedback information for three consecutive sampling positions are required prior to determining a value of the disturbance force, $d_1$, for the middle of the three sampled positions. At each sampling instant, the current reference 380 at that sampling instant is stored with the sampled position. The current reference 380 may subsequently be used to determine the first value of the disturbance force, $d_1$, after the next sampling instant has captured the next position information. The first value of the disturbance force, $d_1$, is stored along with the corresponding position and a second value of the disturbance force, $d_2$, experienced by the mover 20 may be calculated. As noted in Equation 2, samples of the velocity position feedback information for two consecutive sampling positions are required prior to determining the second value of the disturbance force, $d_2$, for the first of the pair of sampled velocities. The velocity feedback signal may be determined as a function of the sampled position using, for example, the velocity feedback signal 345 generated by the derivative block 355 acting on the position feedback signal 395 in the control module 310. Optionally, the feedback circuit 215 may be configured to generate a velocity feedback signal as a function of the signals received from the sensors 210 positioned along track segment 15. According to yet another option, the sensors 210 may be configured to generate a velocity feedback signal as a function of the rate of change of the magnetic field detected as the position magnet 205 passes each sensor. Similar to sampling the position feedback signal, the current reference 380 is sampled at each instant in time with the sampled velocity feedback signal in order to determine the second value of the disturbance force. According to one embodiment of the invention, the position feedback information and the velocity feedback information are sampled in tandem and a single value of the current reference signal 380 is stored with both sampled values for use in determining both the first and the second values of the disturbance force.

The final value of the disturbance force, d, experienced by each mover 100 at a location along the track is determined as a function of both the first value of the disturbance force, $d_1$, and of the second value of the disturbance force, $d_2$. As seen in Equation 3, the final value of the disturbance force, d, is determined as a weighted average of the first value of the disturbance force, $d_1$, and of the second value of the disturbance force, $d_2$. A weighting factor, w, is set to a value between zero (0) and one (1). For an equal weighting between first value of the disturbance force, $d_1$, and the second value of the disturbance force, $d_2$, the weighting value is set to one-half (0.5). In some applications, either the first disturbance force calculation, $d_1$, taken as a function of position, or the second disturbance force calculation, $d_2$, taken as a function of velocity may be more accurate or one of the feedback signals may be subject to a greater level of noise or uncertainty. Initially, the weighting value, w, may be set to one-half. However, the weighting value, w, may be a configurable parameter stored in memory 235 of the segment controller 120. It may be desirable to adjust the weighting value, w, to a value greater than one-half in applications where the position feedback signal is more reliable and to a value less than one-half in applications where the velocity feedback signal is more reliable. After determining a final value of the disturbance force, d, the segment controller 120 may store the value of the disturbance force, a corresponding location and mover identification, along with the sampled feedback signals and the current reference in memory 235. The stored data may then be used during subsequent runs of the mover 20 over the same position.

If it was determined at step 404 that data has been previously stored for the mover 20, the segment controller 120 may next determine whether compensation for the previously measured disturbance force, d, is desired, as shown in step 410. Initially, it may be desirable to allow for multiple runs of the mover 20 across a track segment 15 before compensating for disturbance forces. As will be discussed in more detail below, subsequent runs of a mover 20 may be used to adapt the observed value of the disturbance force, d, to a more accurate value. It is contemplated that a counter may be utilized such that the mover 20 may travel a predefined number of times (e.g., 2-10 or more) across a track segment 15 before beginning to compensate for a measured disturbance force. In other applications, it may be acceptable to begin compensation after a single run across a track segment 15. In still other applications, it may be undesirable to ever compensate for the disturbance force. Rather, the level of the disturbance force may be monitored over time for change and may be utilized to provide an indication of wear and/or required maintenance for the mover 20 and/or track segment 15.

Figure 12:
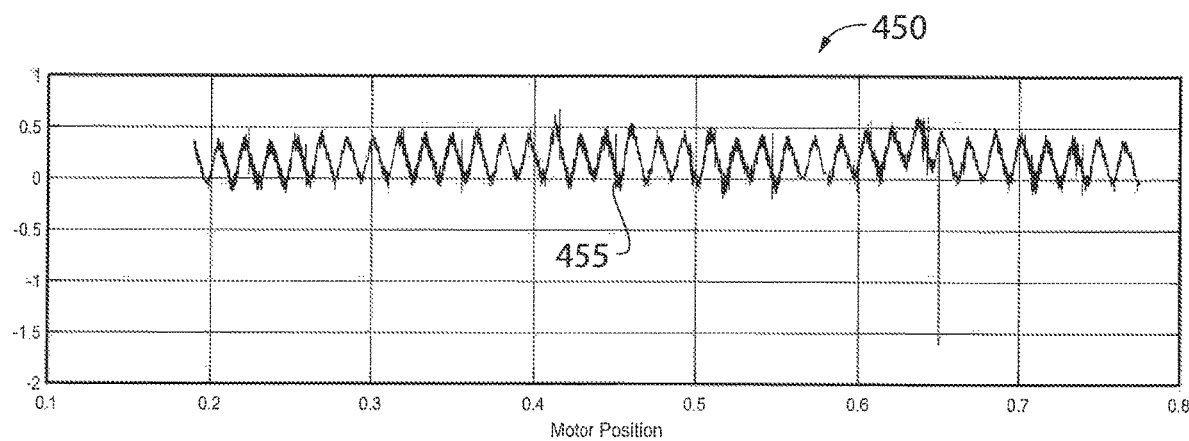
FIG. 12 is a graphical representation of a disturbance force present on a mover traveling along a track segment.

If compensation of the determined disturbance force is desired, the segment controller 120 may execute steps 412, 414, and 416 shown in FIG. 11. At step 412, the segment controller 120 reads the value of the disturbance force, d, which was previously determined for the mover 20 at the present location of the mover. It is contemplated that a segment controller 120 may maintain a look-up table containing values of a disturbance force, d, observed by each mover 20 in the system for each location along the length of the track segment 15. With reference also to FIG. 12, a graph 450 of an exemplary disturbance force experienced by one mover over a portion of the length of a track segment 15 is illustrated. The plot 455 shows a variation in the disturbance force experienced by the mover 20 as a function of the mover position along the track segment 15. Based on prior measured values of disturbance force, d, the segment controller 120 determines a current compensation value, $I_{comp}$, 382 that may be added to the current regulator 385. As seen in FIG. 10, the current compensation value, $I_{comp}$, 382 may be added to the current reference 380 and current feedback 396 signals at a summing junction 384 prior to entering the current loop controller 386. According to FIG. 10, the current loop controller 386 includes a proportional and an integral (PI) controller. Optionally, the current loop controller 386 may be just a proportional (P) controller or further include a derivative (D) controller. Each of the proportional (P), integral (I), and/or derivative (D) controllers of the current loop controller 386 includes a controller gain value. The controller gain values are commonly referred to as a proportional gain (Kip), integral gain (Kii), and a derivative gain (Kid). The output of the current loop controller 386 is a desired current, $I_{desired}$, 388 which is, in turn, used to determine a desired current for each coil 115 along the track.

Figure 13:
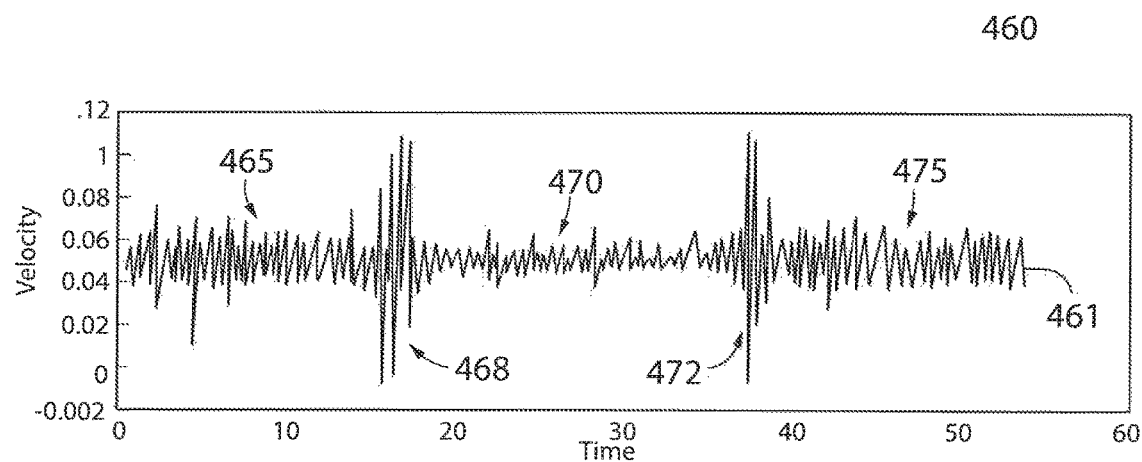
FIG. 13 is a graphical representation of velocity ripple present on a mover as it travels along multiple track segments where the controller compensates for the velocity ripple as the mover travels along the middle track segment.

With the addition of the current compensation value 382, the overall disturbance force is compensated, resulting in a reduction of variation in the velocity of the mover 20 as shown in FIG. 13. FIG. 13 includes a graph 460 with a velocity plot 461 showing the velocity of a mover 20 as it travels along three track segments 15. The first portion 465 and the third portion 475 of the velocity plot 461 are taken along track segments 15 where the corresponding segment controller 120 is not compensating for disturbance forces. The second portion 470 of the velocity plot 461 is taken along a track segment 15 which is compensating for disturbance forces. A first transition point 468 and a second transition point 472 are also illustrated, which indicate a higher level of velocity ripple occurring during a transition between track segments 15. It may be observed from FIG. 13, that compensating for the measured disturbance force, d, reduces the overall velocity ripple experienced by a mover 20 as it travels along a track segment 15.

Returning again to FIG. 11, the segment controller 120 next determines a new value of the disturbance force, d, as shown in step 418. The disturbance force, d, is determined as discussed above with respect to step 406 and as shown in Equations 1-3.

At step 420, the segment controller checks whether it is configured to adapt the stored value of the disturbance force, d, as shown in step 420. In many applications, it will be desirable to adapt the stored value of the disturbance force for a given mover 20 as the mover makes subsequent runs over the same location. As shown in steps 422 and 424, the previously stored value may be adjusted and a new value for the disturbance force, d, stored in memory 235 of the segment controller 120. The previous value of the disturbance force, d, may be adjusted, for example, by averaging multiple values of the disturbance force, d, measured for a mover 20 at the same location along the track segment 15. Optionally, a comparison method may be implemented where the current compensation value 382 supplied to the current regulator 385 is increased or decreased on subsequent runs of the mover 20 and the resultant torque or velocity ripple is evaluated to determine whether the magnitude of the ripple increased or decreased. Still other methods of dynamically adapting the stored value of the disturbance force, d, over multiple runs may be utilized without deviating from the scope of the invention. Having the segment controller 120 dynamically adapt the stored value of the disturbance force, d, over multiple runs improves the accuracy of the stored value and may allow the segment controller 120 to monitor for changes in the disturbance force over time.

In some applications, however, it may be desirable to perform an initial commissioning run and not change the stored value of the disturbance force, d, over time. Certain applications may prefer consistent operation rather than dynamic adaptation. In those applications, the learning option checked at step 420 may be set to disabled and steps 422 and 424 may be bypassed. If dynamic adjustment of the disturbance force, d, is not selected, it will be desirable to obtain as accurate a value of the disturbance force, d, as possible during an initial commissioning run of the system. In other applications, it may be desirable to perform a commissioning run to determine an initial value of the disturbance force and, in combination with this initial value, still adapt the stored value based on subsequent runs of the movers 20 along the track 10.

In either application, the commissioning run may be configured to command movers 20 to run at a very slow speed along the length of the track 10. The segment controller 120 for each track segment 15 may create a look-up table for each mover with stored values of the disturbance force observed along the length of the corresponding track segment 15. To obtain a more accurate characterization of the disturbance force experienced by each mover 20 as it travels along a track segment, the mover 20 may be commanded to travel at a slow speed. The speed may be selected, for example, in the range of one millimeter per second to five millimeters per second. Referring again to Equations 1 and 2 again, it is noted that at a very slow rate of travel, the first term in each equation will be approximately zero because the change in position or the change in velocity over the sampling interval will be very small, and both equations reduce to Equation 4 shown below. Further, because Equations 1 and 2 are identical, Equation 3, as a weighted value of Equations 1 and 2, also reduces to Equation 4 below. During a slow-speed commissioning run, therefore, the disturbance force, d, is determined as a factor of the commanded current and of two known values for the mover.

$$d_{1,2} = \frac{I_n K}{M} \tag{4}$$

At step 426, the segment controller 120 checks whether it is configured to monitor for a change in the disturbance force, d, over time. If the segment controller 120 is not configured to monitor for the change in disturbance force, the disturbance force routine may jump to the end 434 and will execute at the periodic sampling interval. If the segment controller 120 is configured to monitor for the change in disturbance force, d, execution continues at step 428 by comparing the value of the disturbance force determined for a mover 20 against an initial value of the disturbance force. The initial value may have been determined using the commissioning run discussed above or may have been established by one or more runs of the mover 20 along the track segment 15. Once an initial set of values for the disturbance force have been determined for a mover 20, they may be stored in memory 235. During subsequent runs of the mover 20, it is contemplated that the disturbance force determined in the subsequent runs may be compared to the initial set of values. At step 430, the difference between the disturbance force determined for the present run and the initial value is compared to a predefined threshold. If the difference exceeds the threshold, a message is generated, as shown in step 432. The message may be transmitted to a user interface to alert a technician that maintenance or repair of the track segment 15 may be required. It is contemplated, that the disturbance force determined on the present run of the mover 20 may be compared to the stored value of the initial run on a point-by-point basis for specific locations. Optionally, an average value of the amplitude or of a peak-to-peak amplitude for the velocity or torque ripple may be compared. A change in the disturbance force, d, over time may indicate wear on a bearing of the mover 20 or on a rail of the track segment, damage to the mover or track, or a change in the environmental conditions in which the mover 20 is operating.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for monitoring disturbance force in a linear drive system, the method comprising the steps of:
generating a commanded current to be provided to a series of coils spaced along a length of a track in the linear drive system with a controller;
regulating a desired current provided to each of the series of coils with the controller, wherein the desired current corresponds to the commanded current and establishes an electromagnetic field that interacts with at least one mover in the linear drive system to propel the mover along the track;
receiving a feedback signal at the controller, wherein the feedback signal is a measured position, a measured velocity, or both a measured position and a measured velocity of the at least one mover as it is propelled along the track by the desired current;
storing the feedback signal and the commanded current at a corresponding sample time of the feedback signal in memory of the controller; and
determining a disturbance force experienced by the at least one mover at a plurality of positions along the track, wherein the disturbance force is determined by the controller and is a function of the commanded current and the stored feedback signal.

2. The method of claim 1 further comprising the steps of:
storing the disturbance force experienced by the at least one mover in the memory of the controller; and
adding a current compensation value to the commanded current each subsequent time the at least one mover travels along the track, wherein the current compensation value is a function of the disturbance force previously stored in the memory and the desired current corresponds to a sum of the current compensation value and the commanded current.

3. The method of claim 1, wherein the linear drive system includes a plurality of movers and wherein the disturbance force experienced by each of the plurality of movers is determined.

4. The method of claim 3, further comprising the steps of:
storing the disturbance force experienced by each of the plurality of movers in the memory of the controller; and
adding a current compensation value to the commanded current each subsequent time each of the plurality of movers travels along the track, wherein the current compensation value is a function of the disturbance force experienced by the corresponding mover previously stored in the memory and the desired current corresponds to a sum of the current compensation value and the commanded current.

5. The method of claim 1, wherein:
the linear drive system is configured to control the at least one mover to interact with at least one device stationed along the track;
the controller generates the commanded current to obtain a desired interaction between the at least one mover and the at least one device; and
the disturbance force is determined for the at least one mover while the linear drive system is controlling the at least one mover to interact with the at least one device.

6. The method of claim 1, wherein each time the at least one mover travels along the length of the track is defined as a run, the method further comprising the steps of:
generating a plurality of values of the commanded current, wherein each of the plurality of values of the commanded current corresponds to one of a plurality of runs; and
the disturbance force experienced by the at least one mover is determined as a function of the commanded current and the stored feedback signal for each of the plurality of runs.

7. The method of claim 1, wherein each time the at least one mover travels along the length of the track is defined as a run, the method further comprising the steps of:
generating a plurality of values of the commanded current during a first run,
storing the plurality of values of the commanded current during the first run in the memory,
generating a plurality of values of the commanded current during a plurality of additional runs, and
comparing the plurality of values of the commanded current during each of the plurality of additional runs to the plurality of values of the commanded current during the first run.

8. The method of claim 1, wherein:
the desired current propels the mover along the track at a slow speed such that a difference in the feedback signal between sequential sample times is approximately zero,
the feedback signal is not stored in the memory of the controller, and
the disturbance force is determined by the controller as a function of the commanded current and not of the stored feedback signal.

9. An apparatus for monitoring disturbance force in an independent cart system, the apparatus comprising:
a track having a length;
a plurality of coils spaced along the length of the track;
at least one mover configured to travel along the track;
a position feedback assembly configured to generate a feedback signal corresponding to operation of the at least one mover, wherein the feedback signal is a measured position, a measured velocity, or both a measured position and a measured velocity; and
a controller configured to:
  (a) generate a commanded current to be provided to the plurality of coils,
  (b) regulate a desired current output to the plurality of coils, wherein the desired current corresponds to the commanded current and establishes an electromagnetic field that interacts with the at least one mover to propel the mover along the track,
  (c) periodically store the commanded current and the feedback signal in memory of the controller, and
  (d) determine a disturbance force experienced by the at least one mover at a plurality of positions along the track, wherein the disturbance force is a function of the commanded current and the stored feedback signal.

10. The apparatus of claim 9 wherein:
the track includes a plurality of track segments;
the controller includes a plurality of segment controllers, wherein each of the segment controllers is located on one of the plurality of track segments and each of the segment controllers is configured to perform steps (a)-(d) for the corresponding track segment.

11. The apparatus of claim 9 wherein the controller is further configured to:
store the disturbance force experienced by the at least one mover in the memory of the controller; and
add a current compensation value to the commanded current each subsequent time the at least one mover travels along the track, wherein the current compensation value is a function of the disturbance force experienced by the corresponding mover previously stored in the memory and the desired current corresponds to a sum of the current compensation value and the commanded current.

12. The apparatus of claim 9, further comprising a plurality of movers and wherein the controller is further configured to perform steps (a)-(d) for each of the plurality of movers.

13. The apparatus of claim 12, wherein the controller is further configured to:
store the disturbance force experienced by each of the plurality of movers in the memory of the controller; and
add a current compensation value to the commanded current each subsequent time each of the plurality of movers travels along the track, wherein the current compensation value is a function of the corresponding disturbance force previously stored in the memory and the desired current corresponds to a sum of the current compensation value and the commanded current.

14. The apparatus of claim 9, wherein:
the at least one mover is configured to interact with at least one device stationed along the track; and
the controller is further configured to:
  generate the commanded current to obtain a desired interaction between the at least one mover and the at least one device, and
  determine the disturbance force for the at least one mover while controlling the at least one mover to interact with the at least one device.

15. The apparatus of claim 9, wherein:
each time the at least one mover travels along the length of the track is defined as a run,
the controller is further configured to:
  generate a plurality of values of the commanded current, wherein each of the plurality of values of the commanded current corresponds to one of a plurality of runs; and
  the disturbance force experienced by the at least one mover is determined as a function of the commanded current and the stored feedback signal for each of the plurality of runs.

16. The apparatus of claim 9, wherein:
each time the at least one mover travels along the length of the track is defined as a run, the controller is further configured to:
  generate a plurality of values of the commanded current during a first run,
  store the plurality of values of the commanded current during the first run in the memory,
  generate a plurality of values of the commanded current during a plurality of additional runs, and
  compare the plurality of values of the commanded current during each of the plurality of additional runs to the plurality of values of the commanded current during the first run.

17. The apparatus of claim 9, wherein:
the desired current propels the mover along the track at a slow speed such that a difference in the feedback signal between sequential sample times is approximately zero,
the feedback signal is not stored in the memory of the controller, and
the disturbance force is determined by the controller as a function of the commanded current and not of the stored feedback signal.

18. A method for monitoring disturbance force in a linear drive system, wherein the linear drive system includes a plurality of movers configured to travel along a track, the method comprising performing the following steps for each of the plurality of movers:
generating a commanded current to be provided to a series of coils spaced along a length of the track in the linear drive system with a controller;
regulating a desired current provided to each of the series of coils with the controller, wherein the desired current corresponds to the commanded current and establishes an electromagnetic field that interacts with one of the plurality of movers in the linear drive system to propel the mover along the track;
receiving a feedback signal at the controller, wherein the feedback signal is a measured position of the mover as it is propelled along the track by the desired current;
determining a disturbance force experienced by the mover at a plurality of positions along the track, wherein the disturbance force is determined by the controller and is a function of the commanded current; and
storing the feedback signal and the disturbance force experienced by the mover in memory of the controller.

19. The method of claim 18 wherein:
the feedback signal is a measured position or both a measured position and a measured velocity; and
the disturbance force is determined as a function of the commanded current and of the feedback signal.

20. The method of claim 18 wherein the following step is performed for each of the plurality of movers, adding a current compensation value to the commanded current each subsequent time the mover travels along the track, wherein the current compensation value is a function of the disturbance force experienced by the corresponding mover previously stored in the memory.

* * * * *